Jan. 30, 1968   J. N. BRADLEY   3,366,421
DISK WHEEL
Filed July 8, 1964
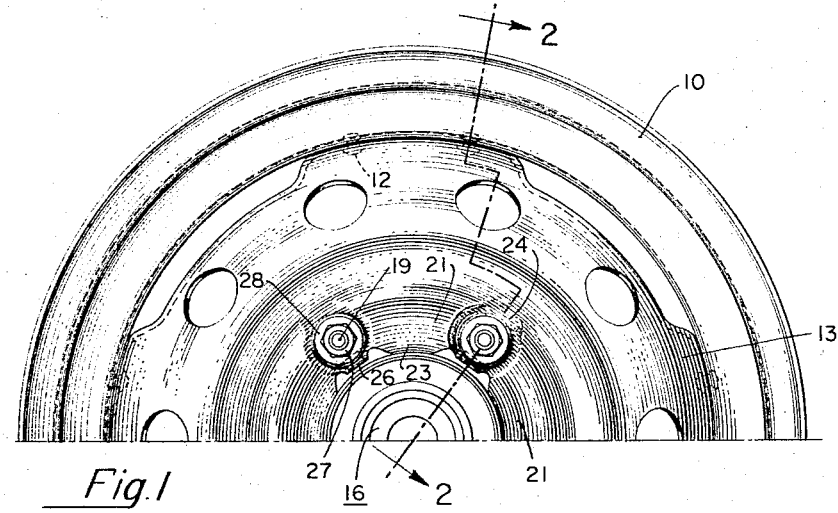
Fig. 1
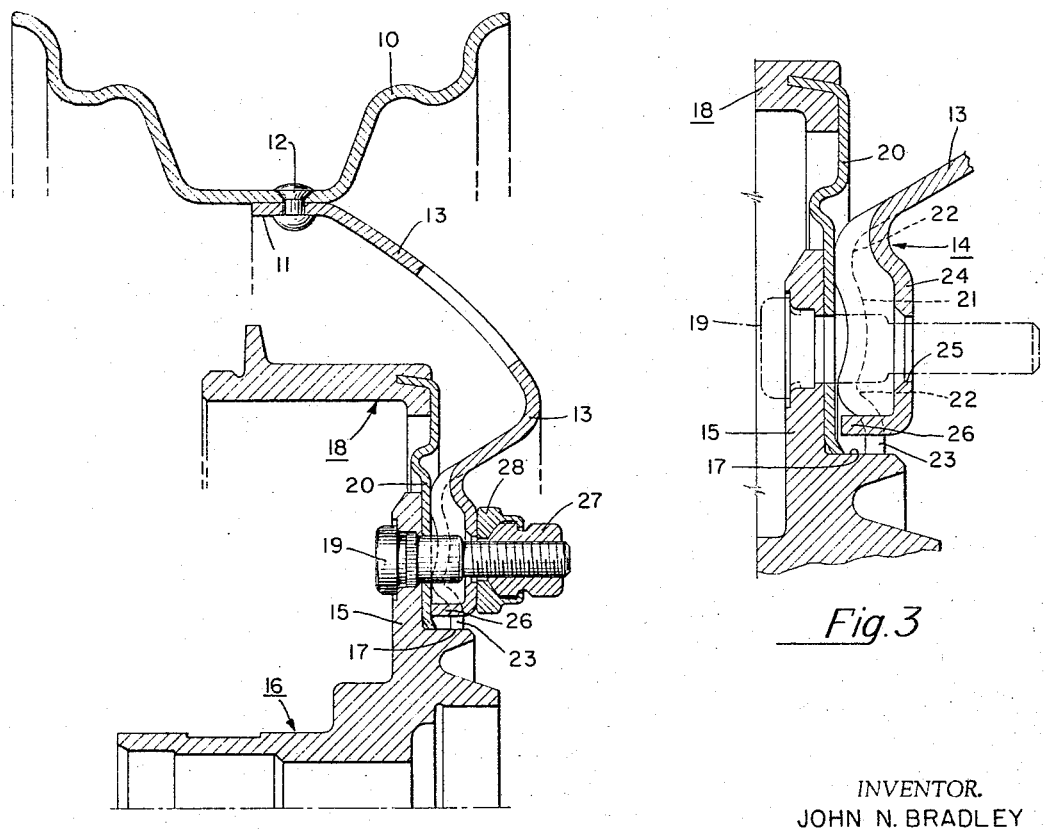
Fig. 2
Fig. 3
INVENTOR.
JOHN N. BRADLEY
BY John B. Sowell
ATTORNEY 3,366,421
DISK WHEEL
John N. Bradley, Grosse Pointe, Mich., assignor to The Budd Company, Philadelphia, Pa., a corporation of Pennsylvania
Filed July 8, 1964, Ser. No. 381,143
5 Claims. (Cl. 301—9)

This invention relates to vehicle single disk wheels. More particularly, it relates to an improved mounting and centering face structure provided with tension adjustment means.

Present day vehicle wheels are subject to very high centrifugal forces that require true balance and a firm non-yielding connection to the hub.

Disk wheels having centering means generally pilot on studs provided in the hub and are centered by tapered seat cap nuts cooperating with a tapered mounting seat on the disk wheel. Alternatively, the disk wheel may have a loose pilot on the hub barrel and be centered by a tapered head cap screw cooperating with a tapered mounting seat on the disk wheel.

Removable disk wheels are generally attached to a mounting face of a hub in surface-to-surface contact causing the wheel disk to be compressed between the hub mounting surface and the cap screw or cap nut. Other removable disk wheels have recessed flanges and/or formed seating surfaces separated from face-to-face contact with the mounting surface of the hub as shown in Patent No. 2,083,325. In all these above-mentioned prior art structures, it is common practice to half-tighten the cap screws or cap nuts so that the wheel centers on the studs before the cap screws or cap nuts are fully tightened. The accuracy of such a centering system depends upon the accuracy of the studs whose centers are usually located by multiple spindle drilling machines. It has been found that the inaccuracies of stud location are so great that otherwise perfectly balanced wheels must be rebalanced on the vehicle.

When cap screws and cap nuts are tightened on the aforementioned disk wheels, any radial and circumferential eccentricity between the tapered mounting seat on the disk wheel and the studs creates stress concentrations in the studs due to bending as well as tension. If the cap screws or nuts are tightened with a torque wrench there is no assurance that the stress in the stud is within recommended tolerances.

Therefore, it is an object of the present invention to provide a disk wheel having an improved radial and axial centering mounting face.

It is a particular object of the present invention to provide a disk wheel having a flexible mounting face which is calibrated to permit predetermined tension stresses in the studs.

It is a further object of the present invention to provide a novel disk wheel mounting and centering structure having a stud tension-setting feature.

The above and other objects and novel features of the invention will be apparent from the following description and accompanying drawings in which:

FIG. 1 is a partial elevation view of the preferred embodiment disk wheel;

FIG. 2 is a section in elevation taken along lines 2—2 of FIG. 1;

FIG. 3 is an enlarged view of the stud area of FIG. 2 illustrating the novel stud tension-setting feature.

In accordance with the present invention there is provided on a wheel disk adapted to be mounted on a flange of a hub a novel mounting structure integrally formed in said wheel disk at the bolt circle comprising: hub mounting portions circumferentially spaced along said bolt circle and adapted to engage said hub flange, cap nut engagement portions circumferentially interspaced and connected to adjacent hub flange mounting portions, said hub flange mounting portions including centering tab portions connected to and extending radially inward from said hub flange mounting portions adapted to engage a cylindrical surface on said hub, and cap nut stop portions connected to said cap nut engagement portions extending axially toward said flange of said hub adapted to engage a surface of said hub when said cap nut engagement portions are deflected by tightening of the cap nuts.

Referring now to FIGS. 1 and 3 showing the preferred embodiment of the present invention. Drop center rim 10 is connected to the axial outer rim support 11 by suitable fastening means such as rivets 12. The continuation of rim support 11 is a reversed curvature axially and radially formed outer disk portion 13 which terminates at its inner portion in a novel mounting, centering and stud tensioning structure 14 adapted to be mounted on a substantially radial flange 15 of a hub 16 provided with a cylindrical centering surface 17. In the preferred embodiment, a brake drum 18 is mounted on the flange 15 over threaded studs 19. It will be understood that the mounting plate 20 of the brake drum 18 is of uniform thickness and forms an extension of the substantially radial flange 15 and could be removed or modified without altering the present invention.

Studs 19 are substantially centered on the radial flange face 15 of the hub 16; this mounting portion is commonly called the bolt circle. Axially and radially formed outer disk portion 13 is so shaped and extended to form hub flange mounting portions 21. Hub flange mounting portions 21 as shown have two arcuate shaped ribs 22 shaped as spaced concentric surfaces defining a plane for engagement with the radial flange 15 of hub 16. The inner periphery of the hub flange mounting portions 21 are provided with a radially inwardly extension providing a tabular centering portion 23 adapted to engage cylindrical centering surface 17 on hub 16. As shown in FIG. 1, hub flange mounting portions 21 are located between circumferentially spaced and alternately disposed studs 19 on the bolt circle. Connected between alternate mounting portions 21 there are provided cap nut engagement portions 24 which are axially offset from the mounting portions 21. The cap nut engagement portions 24 are formed as a continuation of outer disk portion 13 and mounting portions 21 providing an integrally formed continuous disk.

In the preferred embodiment shown, cap nut engagement portions 24 are substantially flat and provided with oversize apertures 25 to avoid engagement with studs 19 thus depending upon tabular centering portion 23 cooperating with cylindrical centering surface 17 to center the wheel on the hub. As shown in FIG. 3, cap nut engagement portions 24 are provided with an axial cap nut stop or gauge extension 26. This axial gauge extension 26 provides precision clearance of five to fifteen thousandths between its end stop and the plane defined by hub flange mounting portions 21. When there is no cap nut on the stud the gauge extension 26 does not touch or engage radial flange 15 as shown in FIG. 3. However, when cap nuts 27 are tightened onto studs 19 the cap nut engagement portions, offset from the hub flange mounting portions, are deflected causing the gauge extensions to be moved toward the radial flange 15. It has been found that the deflection of cap nut engagement portions 24 relative to mounting portions 21 may be calibrated by the predetermined clearance of gauge extension 26 so as to provide an exact and predetermined tension in studs 19.

In actual practice, the friction between self-centering washer 28 of cap nut 27 is subject to variations in friction due to change in surface conditions of the mating faces, interferences of the threads, dirt or grease deposits on the friction surfaces and/or misalignment of the studs. The self-centering type washer 28 substantially eliminates stresses due to misalignment of the studs; oversize aperture 25 eliminates any circumferential forces on the studs due to misalignment and the gauge extensions 26 assure that the proper tension will be provided in the studs 19 regardless of the amount of torque required to bottom the gauge extension on the radial flange.

Having explained the preferred embodiment of the present invention it will be understood that minor modifications in the location of the gauge extensions 26 and the centering portions 23 as well as a reversal of the stud and cap nut fastening means could be achieved by those skilled in the art, and that other modifications and variations of the preferred embodiment could be made without departing from the spirit and scope of the present invention which is limited only by the terms of the appended claims.

What is claimed is:

1. An integral wheel disk having a bolt circle and adapted to be mounted at its bolt circle by cap nuts to a substantially radial hub flange comprising:
   an axially and radially extending wheel disk portion adapted to be attached to a rim at its outer diameter,
   hub mounting portions integral with and extending radially inward from said wheel disk portion and circumferentially spaced along said bolt circle, said hub mounting portions providing a preset fixed plane for engagement with said hub flange,
   cap nut engagement portions extending radially inward from said wheel disk portion and circumferentially interspaced and connected to adjacent hub mounting portions,
   centering tab portions connected to and extending radially inward from said hub mounting portions and adapted to engage a cylindrical surface on said hub,
   and cap nut stop portions connected to and extending axially from said cap nut engagement portions, said cap nut stop portions terminating short of said plane for engagement with said hub flange on said hub mounting portions, whereby engagement and securement of said cap nut with said cap nut engagement portions causes deflection relative to said hub mounting portions sufficient to engage said cap nut stop portions with said radial hub flange.

2. An integral wheel disk having a bolt circle and adapted to be mounted at its bolt circle to a substantially radial flange of a hub comprising:
   an axially inner and radially outer portion for attachment to a rim,
   radially inner mounting portions connected to said outer portion spaced equidisant along said bolt circle and adapted to engage said hub flange,
   cap nut engagement portions connected to said outer portion and said mounting portions, said engagement portions being spaced between alternate mounting portions and located in a plane axially removed from said mounting portions,
   centering portions connected to and extending radially inwardly from said hub mounting portions, said centering portions being adapted to engage a cylindrical surface on said hub,
   and cap nut stop portions connected to and extending axially from said cap nut engagement portions, said cap nut stop portions serving as depth gauges for determining the amount of deflection imparted to said cap nut engagement portions.

3. A wheel disk as set forth in claim 2 which further includes a pair of concentric arcuate spaced ribs formed in said mounting portions defining two lines of a common plane adapted to engage said substantially radial flange of said hub.

4. A wheel disk as set forth in claim 2 wherein said cap nut engagement portion is a flat plane area adapted to engage a self-aligning cap screw having a flat engagement area, and said cap nut engagement portion having an oversize aperture adapted to receive therethrough a stud without engagement therewith.

5. A wheel disk as set forth in claim 3 wherein said wheel disk is attached to said hub my cap screws having flat plane areas for engagement with said cap nut engagement portions.

References Cited
UNITED STATES PATENTS

| | | | |
|---|---|---|---|
| 2,083,327 | 6/1937 | Eksergian | 301—63 X |
| 2,625,438 | 1/1953 | Horn | 301—36 |
| 2,631,894 | 3/1953 | Horn | 301—36 X |
| 3,138,407 | 6/1964 | Duggan | 301—9 |

RICHARD J. JOHNSON, *Primary Examiner.*

BENJAMIN HERSH, *Examiner.*